(12) United States Patent
Abram

(10) Patent No.: US 9,624,837 B2
(45) Date of Patent: Apr. 18, 2017

(54) ADAPTIVE VALVE SPRING RETAINER

(75) Inventor: Kwin Abram, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 466 days.

(21) Appl. No.: 13/466,172

(22) Filed: May 8, 2012

(65) Prior Publication Data

US 2013/0299004 A1 Nov. 14, 2013

(51) Int. Cl.
*F16K 1/20* (2006.01)
*F01N 1/16* (2006.01)
*F02D 9/04* (2006.01)

(52) U.S. Cl.
CPC ............. *F02D 9/04* (2013.01); *F01N 1/16* (2013.01); *F16K 1/2007* (2013.01); *Y10T 137/0525* (2015.04)

(58) Field of Classification Search
CPC .......... F02D 9/1065; F02D 11/10; F02D 9/02; F02D 9/04; F16K 1/22; F16K 1/221; F16K 1/2007; Y10T 137/0525; F01N 1/16
USPC ............ 137/15.25, 527.6, 535; 267/154, 155
See application file for complete search history.

(56) References Cited

U.S. PATENT DOCUMENTS

| | | | |
|---|---|---|---|
| 4,867,122 A * | 9/1989 | Kono et al. | 123/396 |
| 5,829,409 A * | 11/1998 | Saito et al. | 123/396 |
| 5,996,551 A * | 12/1999 | Schroder | 123/337 |
| 6,173,939 B1 * | 1/2001 | Dottavio et al. | 251/129.12 |
| 6,263,898 B1 * | 7/2001 | Vanderveen et al. | 137/15.25 |
| 6,527,006 B2 | 3/2003 | Jackson | |
| 6,641,111 B2 * | 11/2003 | Lorenz et al. | 251/305 |
| 6,840,217 B2 * | 1/2005 | Meiwes et al. | 123/400 |
| 6,918,374 B1 * | 7/2005 | Kurita et al. | 123/396 |
| 6,918,401 B1 * | 7/2005 | Vanderveen et al. | 137/15.25 |
| 7,401,592 B2 | 7/2008 | Willats et al. | |
| 7,537,196 B2 | 5/2009 | Nohl et al. | |
| 7,628,250 B2 | 12/2009 | Abram et al. | |
| 7,748,404 B2 | 7/2010 | Abram et al. | |
| 7,802,424 B2 | 9/2010 | Kanzawa et al. | |
| 2008/0083218 A1 | 4/2008 | Abram et al. | |

(Continued)

FOREIGN PATENT DOCUMENTS

CN 101583784 A 11/2009
FR 2874234 A1 2/2006

(Continued)

OTHER PUBLICATIONS

Supplementary European Search Report for European Application No. 13788387.2 mailed Feb. 19, 2016.

*Primary Examiner* — Craig Schneider
*Assistant Examiner* — Frederick D Soski
(74) *Attorney, Agent, or Firm* — Carlson, Gaskey & Olds, PC

(57) ABSTRACT

An adaptive valve assembly includes a pipe defining a passageway for conducting engine exhaust gases, a pivot shaft supported by the pipe, and a valve body coupled to the pivot shaft. The valve body is moveable between an open position where exhaust gas flow through the passageway is increased and a closed position where exhaust gas flow through the passageway is reduced. A resilient member biases the valve body toward the closed position. A retainer cooperates with the resilient member to define a valve stop for the valve body when in the closed position.

22 Claims, 3 Drawing Sheets

(56) References Cited

U.S. PATENT DOCUMENTS

| | | |
|---|---|---|
| 2008/0236680 A1 | 10/2008 | Abram |
| 2009/0126356 A1 | 5/2009 | Abram |
| 2009/0126357 A1 | 5/2009 | Abram |
| 2009/0126359 A1 | 5/2009 | Abram |
| 2009/0127022 A1 | 5/2009 | Abram |
| 2010/0064673 A1* | 3/2010 | Hahnl .......................... 60/324 |
| 2010/0192560 A1 | 8/2010 | Abram |
| 2010/0313554 A1 | 12/2010 | Abram |
| 2011/0056461 A1 | 3/2011 | Kondo et al. |

FOREIGN PATENT DOCUMENTS

| | | |
|---|---|---|
| JP | 2001207823 A | 8/2001 |
| WO | 2007047316 A2 | 4/2007 |
| WO | 2008121427 A1 | 10/2008 |

* cited by examiner

ADAPTIVE VALVE SPRING RETAINER

TECHNICAL FIELD

The subject invention relates to an adaptive valve assembly that defines a valve stop position using a spring retainer.

BACKGROUND OF THE INVENTION

Exhaust systems are widely known and used with combustion engines. Typically, an exhaust system includes exhaust tubes or pipes that convey hot exhaust gases from the engine to other exhaust system components, such as mufflers, resonators, etc. Mufflers and resonators include acoustic chambers that cancel out sound waves carried by the exhaust gases. Although effective, these components are often relatively large in size and provide limited nose attenuation.

One solution for reducing low frequency noise is to use a passive valve assembly. The passive valve assembly includes a flapper valve body or vane that is positioned within an exhaust pipe, with the vane being pivotable between an open position and a closed position. The passive valve is spring biased toward the closed position, and when exhaust gas pressure is sufficient to overcome this spring bias, the vane is pivoted toward the open position. When the exhaust gas pressure falls, the spring causes the vane to return to the closed position.

With the use of the spring, it is difficult to return the vane to a consistent closed position within the exhaust pipe. Further, while effective at attenuating low frequency noise, the introduction of the passive valve into the exhaust system presents additional noise challenges. For example, when the spring returns the vane to the closed position, closing noise is generated, which is undesirable.

SUMMARY OF THE INVENTION

An adaptive valve assembly includes a pipe defining a passageway for conducting engine exhaust gases, a pivot shaft supported by the pipe, and a valve body coupled to the pivot shaft. The valve body is moveable between an open position where exhaust gas flow through the passageway is increased and a closed position where exhaust gas flow through the passageway is reduced. A resilient member biases the valve body toward the closed position. A retainer cooperates with the resilient member to define a valve stop for the valve body when in the closed position.

In one example, the retainer comprises a first retainer piece fixed to a non-rotating structure and a second retainer pieced fixed to the pivot shaft. The first retainer piece provides the valve stop.

In one example, the resilient member comprises a spring having a first spring end configured to be fixed to the non-rotating structure and a second spring end configured to be rotatable with the shaft. The second spring end engages the first retainer piece to define the valve stop. The second spring end moves out of engagement with the first retainer piece as the valve body moves toward the open position.

In one example, the adaptive valve assembly comprises a passive valve where the valve body is solely moveable from the closed position toward the open position in response to an increase in exhaust gas pressure flow against the valve body.

One exemplary method of controlling movement of the adaptive valve assembly comprising the steps of: providing a valve body moveable between an open and closed position within an exhaust gas passageway; resiliently biasing the valve body toward the closed position with a resilient member; and defining a valve stop position for the valve body in the closed position with a retainer that supports the resilient member.

DETAILED DESCRIPTION

Figure 1:
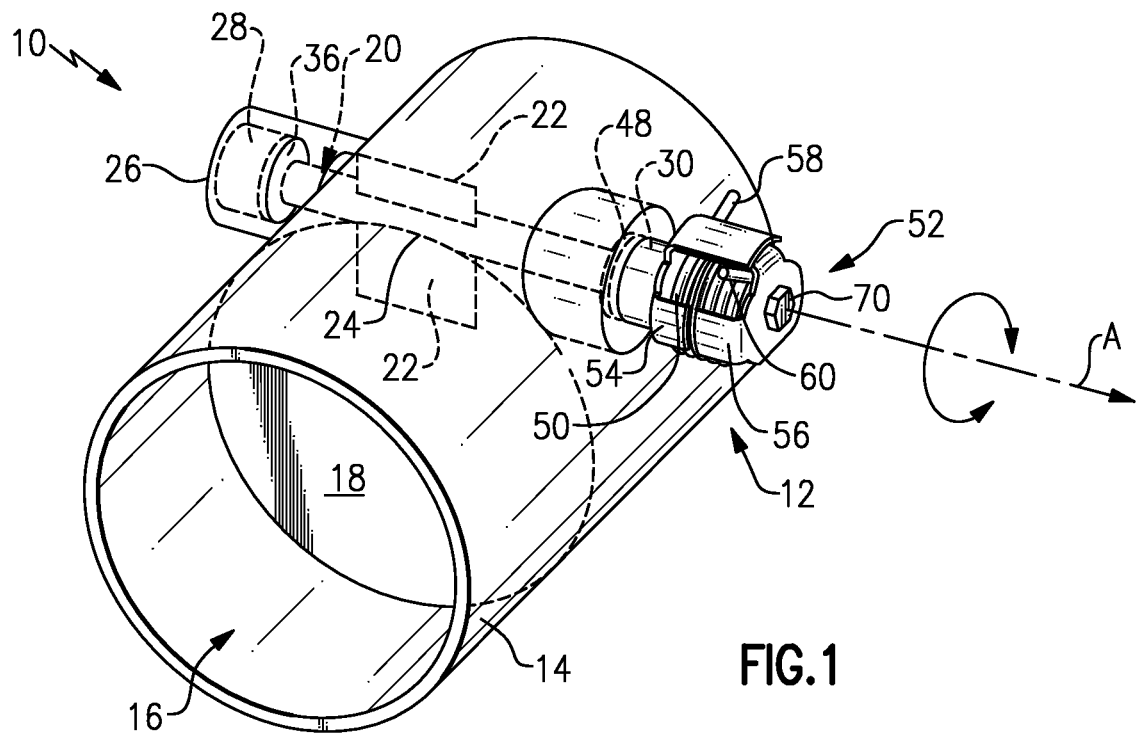
FIG. 1 is a schematic view of a vehicle exhaust component incorporating a passive valve assembly.

FIG. 1 is a schematic view of an exhaust component 10 that includes an exhaust valve assembly 12 that is movable between an open position and a closed position. In the example shown, the exhaust component 10 comprises a pipe or a tube body 14 that defines an exhaust gas flow path 16 that conducts heated exhaust gases from an internal combustion engine (not shown) to downstream exhaust components. The exhaust valve assembly 12 includes a valve body 18 that blocks at least a substantial portion of the exhaust gas flow path 16 when in the closed position and is pivoted toward the open position to minimize blockage.

The valve body 18 is fixed to a pivot shaft 20 with a connecting member 22. In one example, a slot 24 is formed within an outer surface of the tube body 14. A housing 26, shown in the example of FIG. 2 as a square metal structure, is received within this slot 24 and is welded to the tube body 14. Other housing configurations with other shapes (see FIG. 1, for example) and mounting configurations could also be used. The shaft 20 is rotatably supported within the housing 26 by first 28 and second 30 bushings.

In the example shown, the connecting member 22 comprises a piece of sheet metal that has one portion welded to the shaft 20 and another portion that extends outwardly from the housing 26 and is welded to the valve body 18. Thus, the valve body 18 and the shaft 20 pivot together about an axis A. The connecting member 22 is just one example of how the shaft 20 can be attached to the valve body 18, it should be understood that other attachment mechanisms could also be used, or the shaft and the valve body could be formed together as a single-piece component.

Figure 2:
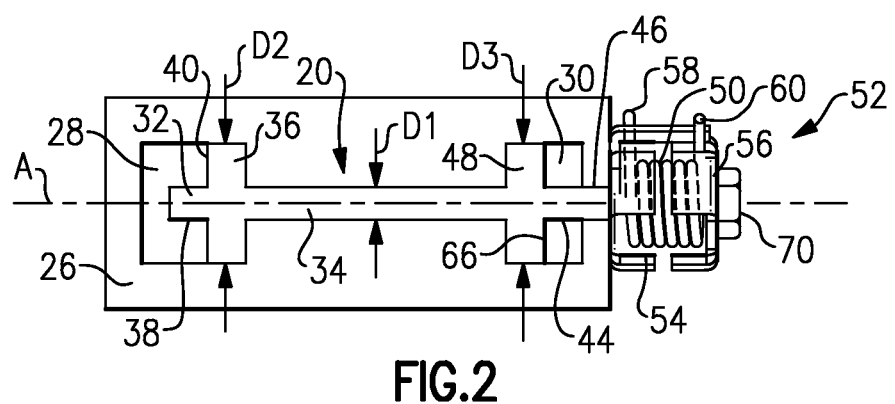
FIG. 2 is a schematic top view of FIG. 1.

The first bushing 28 is positioned generally at a first shaft end 32 as shown in FIG. 2. The first bushing 28 comprises a sealed interface for the first shaft end 32. The shaft 20 includes a shaft body 34 with a first collar 36 near the first shaft end 32. The first bushing 28 includes a first bore 38 that receives the first shaft end 32 such that the first shaft end 32 does not extend axially beyond the first bushing 28. The first collar 36 abuts directly against an end face 40 of the first bushing 28 such that exhaust gas cannot leak out of the first bushing 28 along a path between the shaft 20 and first bushing 28.

The second bushing 30 includes a second bore 44 through which the shaft body 34 extends to a second shaft end 46.

The shaft 20 includes a second collar 48 that is located axially inboard of the second bushing 30.

The shaft 20 extends through the second bore 44 to an axially outboard position relative to the second bushing 30. A resilient member, such as a spring 50 for example, is coupled to the second shaft end 46 with a retainer 52. The retainer 52 includes a first retainer piece 54 that is fixed to the housing 26 or pipe body 14 and a second retainer piece 56 that rotates with the shaft 20. One spring end 58 is fixed to a non-rotating structure and a second spring end 60 is configured to rotate with the shaft 20.

In the example shown, the spring 50 comprises a coil spring that is configured to be compressed both in an axial direction along axis A and in a torsional direction about axis A during installation. Torsional loading creates a preload force that biases the shaft 20 and the valve body 18 toward the closed position. As gas flow increases, this torsional force is overcome to move the valve body 18 toward the open position. The axial force serves to positively seat and seal the second collar 48 against an end face 66 of the second bushing 30. This prevents any exhaust gas from leaking out of the second bushing 30 by sealing off a passage between an outer surface of the shaft 20 and a bore surface of the second bushing 30. Thus, a single spring is used to provide both axial and torsional loading, resulting in a configuration that can both hold the exhaust valve assembly 12 in a desired operational position as well as preventing exhaust gas leakage.

The valve body 18 can only move toward the open position in response to an exhaust gas pressure force that overcomes the biasing force of the spring 50. In other words, the valve comprises a passive valve as opposed to an actively controlled valve where a controller is used to actively move the valve body to a desired valve position.

As discussed above, the spring 50 is associated with a retainer 52. The retainer 52 cooperates with the spring 50 to define a valve stop for the valve body 18 when in the closed position, i.e. interaction of the spring 50 with the retainer 52 defines the closed position for the valve body 18.

The retainer 52 includes a first retainer piece 54 that is fixed to a non-rotating structure such as the housing 26 or tube body 14, for example, and a second retainer piece 56 that is fixed to the second shaft end 46. In one example, the first retainer piece 54 is secured to the non-rotating structure by welding; however, other attachment methods could also be used. In one example, a fastener 70 is used to secure the second retainer piece 56 to the shaft 20; however, other methods could also be used. A first spring end 58 is fixed relative to the first retainer piece 54, i.e. the spring end 58 and first retainer piece 54 comprise non-rotating components, and a second spring end 60 is configured to rotate with the shaft 20.

Figure 3A:
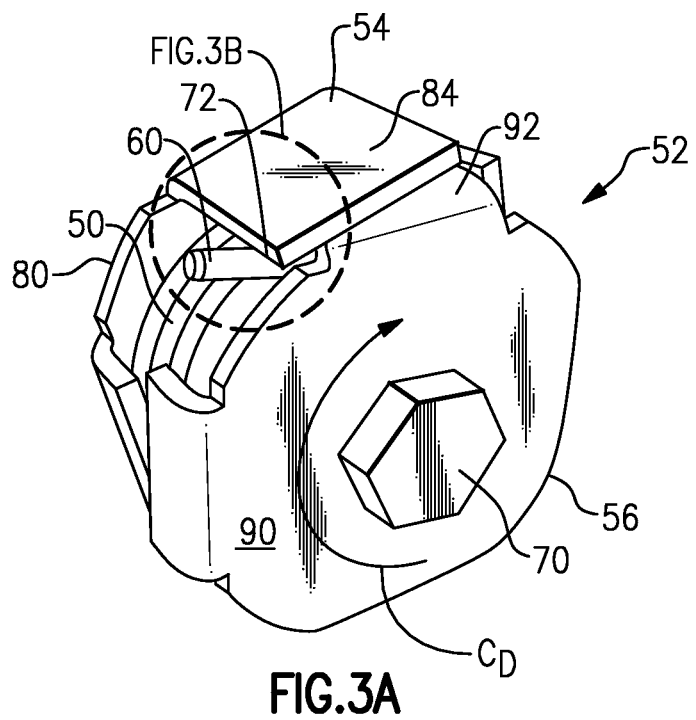
FIG. 3A is a perspective view of a spring retainer assembly from FIG. 1 showing the valve assembly in a fully closed position.
Figure 3B:
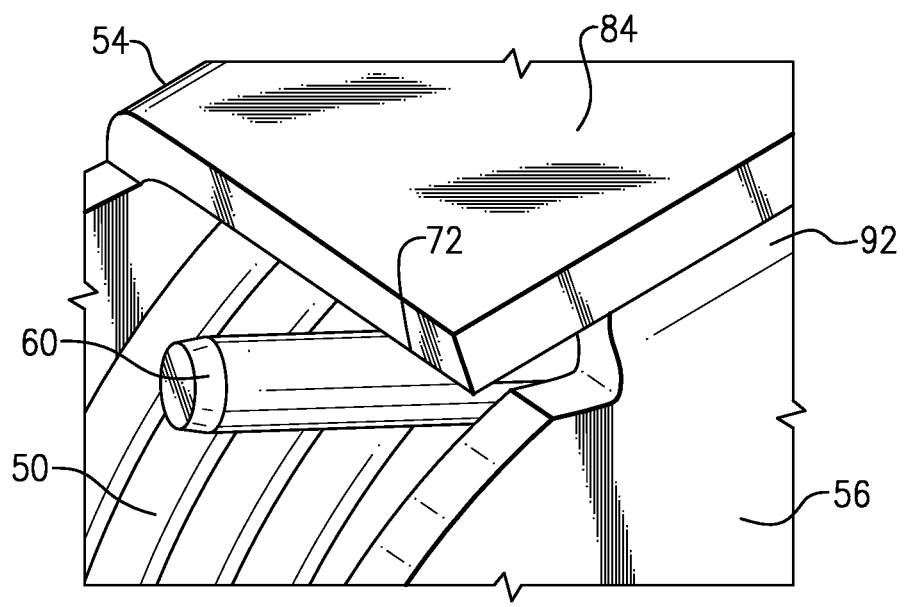
FIG. 3B is a magnified view of FIG. 3A.
Figure 4:
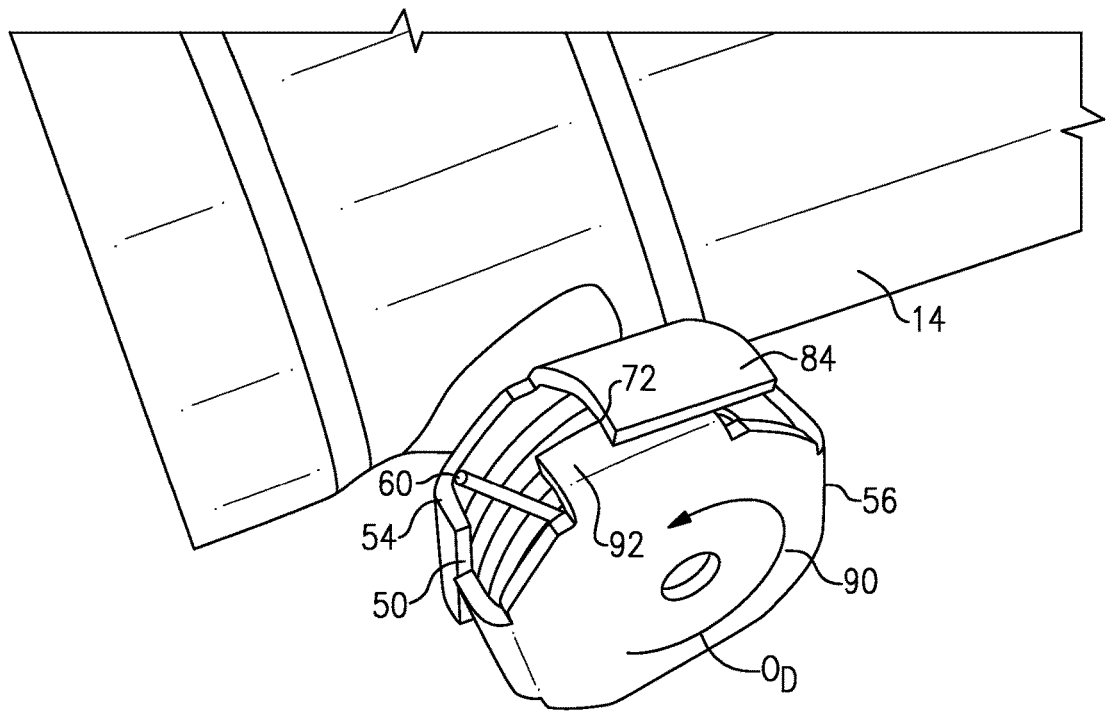
FIG. 4 is a perspective view of the spring retainer assembly from FIG. 3A showing the valve assembly moving toward a fully open position.

The first retainer piece 54 provides a valve stop 72 (FIGS. 3A-3B). The second spring end 60 engages the first retainer piece 54 to define the valve stop 72 in the closed position. The second spring end 60 moves out of engagement with the first retainer piece 54, i.e. rotates with the shaft 20 away from the first retainer piece 54, as the valve body 18 moves toward the open position (FIG. 4).

Figure 5:
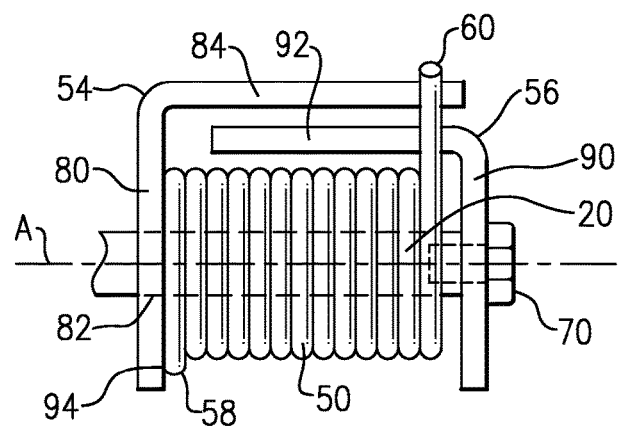
FIG. 5 is a front view of the spring retainer assembly of FIG. 3A.

In one example, the first retainer piece 54 comprises a first end plate 80 having an opening 82 through which the pivot shaft 20 extends (FIG. 5) such that the shaft 20 can rotate relative to the end plate 80. The first end plate 80 is fixed to the non-rotating structure as described above. The first retainer piece 54 includes at least one extension portion 84 extending transversely relative to the first end plate 80 and toward the second retainer piece 56. In the example shown, the extension portion 84 comprises a generally flat plate that extends over the spring 50. The second spring end 60 engages the extension portion 84 to define the valve stop 72 (FIG. 3B).

In one example, second retainer piece 56 comprises a second end plate 90 that is fixed to the pivot shaft 20. The second end plate 90 includes at least one extension portion 92 extending transversely relative to the second end plate 90 and toward the first retainer piece 54. In the example shown, the extension portion 92 comprises a generally flat plate that extends over the spring 50. The extension portions 84, 92 of the first 80 and second 90 end plates are positioned in an overlapping relationship with each other and are located radially outwardly of the spring 50 relative to the axis A.

In the example, shown the spring 50 comprises a coil spring that surrounds the pivot shaft 20. The first retainer piece 54 includes an abutment surface 94 (FIG. 5) to hold the first spring end 58 fixed relative to the pivot shaft 20. The second retainer piece 56 and the second spring end 60 are coupled for rotation together with the pivot shaft 20. As discussed above, the valve body 18 is solely moveable from the closed position toward the open position in response to an increase in exhaust gas pressure flow against the valve body 18. As this force increases to overcome the biasing force of the spring 50. The second retainer piece 56 and pivot shaft 20 rotate to move the second spring end 60 away from the valve stop 72 of the first retainer piece 54 (FIG. 4). When the exhaust gas pressure falls below the biasing force of the spring 50, the spring 50 causes the valve body 18 to return to the closed position where the second spring end 60 engages the first retainer piece 54 at the valve stop 72.

As such, a method of controlling movement of the adaptive valve assembly comprises the following steps. A valve body 18 is provided that is moveable between an open and closed position within an exhaust gas passageway. The valve body is resiliently biased toward the closed position with a resilient member 50. A valve stop 72 position is defined for the valve body 18 in the closed position with a retainer 52 that is associated with the resilient member 50.

Additional steps include providing the retainer with a first retainer piece 54 and a second retainer piece 56, fixing the first retainer piece 54 to a non-rotating structure that defines the exhaust gas passageway, fixing the second retainer piece 56 for rotation with a pivot shaft 20 that supports the valve body 18, and defining the valve stop position on the first retainer piece 54. The first spring end 58 is associated with the first retainer piece 54, the second spring end 60 is configured to move with the pivot shaft 20, and the second spring end 60 is abutted against the first retainer piece 54 to define the valve stop 72 position.

As such, the spring itself is used as a resilient stop, i.e. a soft stop, to minimize impact noise when the valve closes. Further, the spring comprises a hardened component such that wear due to contact is minimized.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. An adaptive valve assembly comprising:
   a pipe defining a passageway for conducting engine exhaust gases;
   a pivot shaft supported by said pipe;
   a valve body coupled to said pivot shaft, said valve body moveable between an open position where exhaust gas flow through said passageway is increased and a closed position where exhaust gas flow through said passageway is reduced;

a resilient member biasing said valve body toward said closed position, wherein said resilient member comprises a spring having a first spring end configured to be fixed to a non-rotating structure and a second spring end configured to be rotatable with said pivot shaft; and a retainer that cooperates with said resilient member to define a valve stop for said valve body when in said closed position, wherein said retainer comprises a first retainer piece fixed to said non-rotating structure and a second retainer piece fixed to said pivot shaft, and wherein said first retainer piece provides said valve stop, and said first retainer piece includes an abutment surface surrounding a pivot shaft opening which directly abuts against an end face of said spring, and wherein the first retainer piece comprises a first end plate with said pivot shaft opening through which the pivot shaft extends and an extension portion that extends axially away from one edge of the first end plate to define the valve stop, and wherein the first end plate includes the abutment surface surrounding said pivot shaft opening.

2. The adaptive valve assembly according to claim 1 wherein said first spring end remains fixed to the non-rotating structure when said second spring end moves out of engagement with said first retainer piece as said valve body moves toward said open position.

3. The adaptive valve assembly according to claim 1, wherein said spring comprises a coil spring that surrounds said pivot shaft, and wherein said abutment surface extends around said pivot shaft opening and directly abuts against an end face defined by an end coil of said spring that surrounds said pivot shaft.

4. The adaptive valve assembly according to claim 1 wherein the second spring end engages said valve stop when in said closed position and moves out of engagement with said valve stop when in said open position with said end face of said spring being engaged with said abutment surface during rotation.

5. The adaptive valve assembly according to claim 1, wherein said resilient member and said retainer are located externally of said pipe.

6. The adaptive valve assembly according to claim 5, wherein the adaptive valve assembly comprises a passive valve where said valve body is solely moveable from said closed position toward said open position in response to an increase in exhaust gas pressure flow against said valve body.

7. The adaptive valve assembly according to claim 1, wherein the second retainer piece rotates the second spring end out of engagement with the first retainer piece as exhaust gas flow overcomes a biasing force of the spring and wherein the second spring end returns to engage the valve stop of the first retainer piece when the biasing force exceeds exhaust gas flow pressure.

8. The adaptive valve assembly according to claim 7, wherein the extension portion of the first retainer piece comprises a first plate portion extending over the spring and the second retainer piece comprises a second plate portion extending over the spring in a radially overlapping relationship with the first plate portion, and wherein the first and second plate portions are radially spaced apart from each other by a gap such that the second plate portion rotates about the axis relative to the first plate portion.

9. The adaptive valve assembly according to claim 1 wherein said first end plate is fixed to said non-rotating structure, and wherein said extension portion extends transversely relative to said first end plate and toward said second retainer piece, said second spring end engaging said extension portion to define said valve stop.

10. The adaptive valve assembly according to claim 9, wherein said second retainer piece comprises a second end plate that is fixed to said pivot shaft, said second end plate including at least one extension portion extending transversely relative to said second end plate and toward said first retainer piece, and wherein said extension portions of said first and second end plates are positioned in an overlapping relationship with each other.

11. The adaptive valve assembly according to claim 9, wherein said abutment surface holds said first spring end fixed relative to said pivot shaft.

12. A method of controlling movement of an adaptive valve assembly comprising the steps of:

(a) providing a valve body moveable between an open and closed position within an exhaust gas passageway;

(b) providing a retainer with a first retainer piece and a second retainer piece, and including fixing the first retainer piece to a non-rotating structure that defines the exhaust gas passageway, and fixing the second retainer piece for rotation with a pivot shaft that supports the valve body;

(c) resiliently biasing the valve body toward the closed position with a resilient member, wherein the resilient member comprises a spring having a first spring end and a second spring end, and including associating the first spring end with the non-rotating structure and configuring the second spring end to move with the pivot shaft;

(d) providing the first retainer piece with an abutment surface surrounding a pivot shaft opening which directly abuts against an end face of said spring which surrounds the pivot shaft; and (e) defining a valve stop position on the first retainer piece for the valve body in the closed position wherein the second spring end abuts against the first retainer piece in the valve stop position, and wherein the first retainer piece comprises a first endplate, which includes the pivot shaft opening through which the pivot shaft extends, and a first extension portion that extends axially away from one edge of the first endplate to define the valve stop, and wherein the first endplate includes the abutment surface surrounding said pivot shaft opening, and wherein the second retainer piece comprises a second end plate that is fixed to the pivot shaft and which further includes a second extension portion that extends axially away from one edge of the second endplate to be in an overlapping relationship with the first extension portion.

13. The method according to claim 12, including locating the resilient member and the retainer externally of the exhaust gas passageway, and only moving the valve body from the closed position toward the open position when a pressure of exhaust gas within the exhaust gas passageway exceeds a biasing force of the resilient member.

14. The method according to claim 12, wherein the valve body rotates about an axis relative to the non-rotating structure, and including rotating the second spring end with the second retainer piece out of engagement with the first retainer piece as exhaust gas flow overcomes a biasing force of the resilient member and wherein the second spring end rotates to return to engage the first retainer piece, which defines the valve stop position, when the biasing force exceeds exhaust gas flow pressure.

15. The method according to claim 14, including spacing the first and second extension portions radially apart from each other such that the second extension portion rotates about the axis relative to the first extension portion.

16. The method according to claim 12, wherein the first extension portion extends to a first distal end that is free from contact with the second retainer piece, and wherein the valve stop is formed at a side edge of the first extension portion, and wherein the second extension portion extends to a second distal end that is free from contact with the first retainer piece, and including spacing the first and second extension portions apart from each other by a gap that is maintained as the valve body moves between the open and closed positions.

17. An adaptive valve assembly comprising:
a pipe defining a passageway for conducting engine exhaust gases;
a pivot shaft supported by said pipe;
a valve body coupled to said pivot shaft for rotation about an axis, said valve body moveable between an open position where exhaust gas flow through said passageway is increased and a closed position where exhaust gas flow through said passageway is reduced;
a resilient member biasing said valve body toward said closed position, wherein said resilient member includes a first end that is held fixed relative to said pipe and a second end that rotates with said pivot shaft; and
a retainer that cooperates with said resilient member to define a valve stop for said valve body when in said closed position, and wherein said retainer comprises a first piece fixed relative to said pipe and a second piece that is fixed for rotation with said pivot shaft, said first piece defining said valve stop, and wherein said first spring end remains fixed when said second end of said resilient member rotates about said axis out of engagement with said first piece as exhaust gas flow overcomes a biasing force of said resilient member and wherein said second end rotates to return to engage said valve stop of the first piece when the biasing force exceeds exhaust gas flow pressure, and said first piece including an abutment surface surrounding a pivot shaft opening, and wherein an end face of said resilient member abuts directly against said abutment surface, and wherein the first retainer piece comprises a first endplate, which includes the pivot shaft opening through which the pivot shaft extends, and a first extension portion that extends axially away from one edge of the first endplate to define the valve stop, and wherein the first endplate includes the abutment surface surrounding said pivot shaft opening.

18. The adaptive valve assembly according to claim 17, wherein the second retainer piece comprises a second end plate that is fixed to the pivot shaft and which further includes a second extension portion that extends axially away from one edge of the second endplate to be in an overlapping relationship with the first extension portion.

19. The adaptive valve assembly according to claim 18, wherein the first extension portion extends to a first distal end that is free from contact with the second retainer piece, and wherein the valve stop is formed at a side edge of the first extension portion.

20. The adaptive valve assembly according to claim 19, wherein the second extension portion extends to a second distal end that is free from contact with the first retainer piece, and wherein said first and second extension portions are spaced apart from each other by a gap that is maintained as the valve body moves between the open and closed positions.

21. An adaptive valve assembly comprising:
a pipe defining a passageway for conducting engine exhaust gases;
a pivot shaft supported by said pipe;
a valve body coupled to said pivot shaft, said valve body moveable between an open position where exhaust gas flow through said passageway is increased and a closed position where exhaust gas flow through said passageway is reduced;
a resilient member biasing said valve body toward said closed position, wherein said resilient member comprises a spring having a first spring end configured to be fixed to a non-rotating structure and a second spring end configured to be rotatable with said pivot shaft;
a retainer that cooperates with said resilient member to define a valve stop for said valve body when in said closed position, wherein said retainer comprises a first retainer piece fixed to said non-rotating structure and a second retainer piece fixed to said pivot shaft, and wherein said first retainer piece provides said valve stop, and said first retainer piece includes an abutment surface surrounding a pivot shaft opening which directly abuts against an end face of said spring; and
wherein the first retainer piece comprises a first endplate, which includes the pivot shaft opening through which the pivot shaft extends, and a first extension portion that extends axially away from one edge of the first endplate to define the valve stop, and wherein the first endplate includes the abutment surface surrounding said pivot shaft opening, and wherein the second retainer piece comprises a second end plate that is fixed to the pivot shaft and which further includes a second extension portion that extends axially away from one edge of the second endplate to be in an overlapping relationship with the first extension portion.

22. The adaptive valve assembly according to claim 21, wherein the first extension portion extends to a first distal end that is free from contact with the second retainer piece, and wherein the valve stop is formed at a side edge of the first extension portion, and wherein the second extension portion extends to a second distal end that is free from contact with the first retainer piece, and wherein the first and second extension portions are spaced apart from each other by a gap that is maintained as the valve body moves between the open and closed positions.

\* \* \* \* \*

UNITED STATES PATENT AND TRADEMARK OFFICE
CERTIFICATE OF CORRECTION

PATENT NO.         : 9,624,837 B2                                      Page 1 of 1
APPLICATION NO.    : 13/466172
DATED              : April 18, 2017
INVENTOR(S)        : Kwin Abram It is certified that error appears in the above-identified patent and that said Letters Patent is hereby corrected as shown below:

In the Claims

In Claim 8, Column 5, Line 66; before "axis relative" replace "the" with --an--

In Claim 17, Column 7, Line 36; before "end remains" delete "spring"

Signed and Sealed this
Eighth Day of August, 2017

Joseph Matal
*Performing the Functions and Duties of the
Under Secretary of Commerce for Intellectual Property and
Director of the United States Patent and Trademark Office*